(12) United States Patent
McKay et al.

(10) Patent No.: US 12,352,659 B2
(45) Date of Patent: Jul. 8, 2025

(54) PRESSURE SEAL WITH BUILT IN TESTING SYSTEM

(71) Applicant: Expro North Sea Limited, Dyce (GB)

(72) Inventors: John Henry McKay, Stonehaven (GB); David Sirda Shanks, Aberdeen (GB)

(73) Assignee: Expro North Sea Limited, Dyce (GB)

( * ) Notice: Subject to any disclaimer, the term of this patent is extended or adjusted under 35 U.S.C. 154(b) by 822 days.

(21) Appl. No.: 17/434,884

(22) PCT Filed: Feb. 26, 2020

(86) PCT No.: PCT/GB2020/050452
§ 371 (c)(1),
(2) Date: Aug. 30, 2021

(87) PCT Pub. No.: WO2020/174232
PCT Pub. Date: Sep. 3, 2020

(65) Prior Publication Data
US 2022/0170812 A1    Jun. 2, 2022

(30) Foreign Application Priority Data
Feb. 28, 2019   (GB) .................................... 1902732

(51) Int. Cl.
*G01M 3/28*       (2006.01)
*E21B 17/02*      (2006.01)

(52) U.S. Cl.
CPC ......... *G01M 3/2869* (2013.01); *E21B 17/028* (2013.01)

(58) Field of Classification Search
CPC .. G01M 3/2869; E21B 17/028; F16J 15/3296; F16J 15/18; F16J 15/182
See application file for complete search history.

(56) References Cited

U.S. PATENT DOCUMENTS

| | | | | |
|---|---|---|---|---|
| 5,412,977 A | * | 5/1995 | Schmohl ............. | F04D 27/0292 277/318 |
| 5,755,372 A | * | 5/1998 | Cimbura, Sr. ......... | E21B 33/08 277/318 |
| 6,504,888 B1 | * | 1/2003 | Fife ...................... | G21C 15/243 415/110 |
| 2003/0111796 A1 | | 6/2003 | Kohli | |
| 2005/0082764 A1 | | 4/2005 | Smith, III | |
| 2005/0213898 A1 | | 9/2005 | Rubinstein | |
| 2008/0012236 A1 | * | 1/2008 | Reilly ...................... | F16J 15/26 277/318 |
| 2010/0289225 A1 | | 11/2010 | Lafleur | |
| 2014/0151998 A1 | | 6/2014 | Jahn | |

FOREIGN PATENT DOCUMENTS

GB    2504184 B    12/2014

\* cited by examiner

*Primary Examiner* — Gilbert Y Lee
(74) *Attorney, Agent, or Firm* — Getz Balich LLC (57) ABSTRACT

A connector is described, including a housing including an internal volume, a port in the housing for receiving a conduit and providing access to the internal volume, a sealing arrangement for sealing the internal volume in the housing and a seal integrity test system including a sensor coupled to the housing. The seal integrity test system is configured to provide a measurement based on the pressure inside the internal volume of the housing to establish the integrity of the sealing arrangement.

14 Claims, 11 Drawing Sheets

PRESSURE SEAL WITH BUILT IN TESTING SYSTEM

This application claims priority to PCT Patent Appln. No. PCT/GB2020/050452 filed Feb. 26, 2020, which claims priority GB Patent Appln. No. 1902732.5 filed Feb. 28, 2019, which are herein incorporated by reference.

BACKGROUND OF THE INVENTION

1. Technical Field

Some examples relate to a connector, which may be used in conjunction with a downhole device.

2. Background Information

In industrial hydraulics and product applications in naturally high pressure environments where many thousands of PSI of pressure is present there is a need to make good connections to hydraulic pipes and also where metal clad cables are used to protect wires from the hydraulic pressures there is a need for good pressure connections.

In many instances these pressure connections are made in field locations and in some instances under poor working conditions and so there is a requirement to prove that these field made connections are not leaking, and so there is a common practice of having pressure test ports allowing the newly made connections to be pressure tested. In some applications these connections are critical components in complex systems and so the importance of these seals being sound and not leaking, and indeed the seal lasting for long periods, often many years, is paramount. In some of these instances there is a tendency to implement multiple redundant seals to create backup seals and also increase the life span of the product.

With multiple mission critical seals it becomes immediately difficult to prove each seal is not leaking, since a pressure test port itself creates a new leak path, and so the very act of creating a test port compromises the seals themselves.

SUMMARY OF THE INVENTION

According to one example there is disclosed a connector, comprising: a housing comprising an internal volume; a port in the housing for receiving a conduit and providing access to the internal volume; a sealing arrangement for sealing the internal volume in the housing; a seal integrity test system comprising a sensor coupled to the housing; the seal integrity test system being configured to provide a measurement based on the pressure inside the internal volume of the housing to establish the integrity of the sealing arrangement.

In use, the connector may permit connection of a conduit to a device in a high pressure environment, while maintaining a reliable and fluid-tight seal between the internal components of the device and the external environment. The connector, or components thereof, may be configured to permit the integrity of the sealing arrangement to be tested in a non-invasive way (e.g. a way that does not require the insertion of a pressure testing device inside the housing, or that does not require further conduits or ports to be drilled into the housing) prior to installation of the connector in a high pressure environment. As such, the connector may be used to test if the sealing arrangement is leak tight, without compromising the seals themselves.

At least part of the sealing arrangement may be located inside the internal volume in the housing. The sealing arrangement located inside the housing may have the effect of compartmentalizing the internal volume in the housing into a plurality of fluid sealed compartments in the housing. The sealing arrangement may comprise a plurality of seals, and at least one seal in the sealing arrangement may be selectively energized so as to vary any compartments defined in the internal volume of the housing. The seal integrity test system may be configurable to selectively energize a seal in the sealing arrangement for such a purpose. By selectively energizing seals in the sealing arrangement and varying the compartments therein, the integrity test system may enable individual seals within the sealing arrangement to be tested.

The positioning of the seal integrity test system relative to the housing may facilitate measurement of a parameter (e.g. strain, pressure etc.) at multiple locations in the internal volume in the housing (e.g. at least two locations inside the internal volume in the housing). The seal integrity test system may be configured to detect the level of pressure in an internal volume in the housing. The seal integrity system may be configured to detect the level of pressure at multiple locations in the internal volume of the housing, and optionally to compare the level of pressure at said multiple locations to determine the integrity of the sealing arrangement. For example, during an integrity test of the sealing arrangement, the seal integrity test system may be configured to detect the level of pressure in a region (e.g. a compartment) of the internal volume expected to be at a relatively higher pressure, and also configured to detect the level of pressure in a region of the internal volume expected to be at a relatively lower pressure. A user may be able to determine the integrity of the sealing arrangement by comparing the pressure detected by the seal integrity test system and the expected pressure in each region (e.g. compartment). As a comparison between pressures is required to determine the presence of a leak, the user may not require a precise reading or measurement of a parameter by the seal integrity test system, and as such a simply binary output from the seal integrity test system may suffice. A region at a relatively higher pressure may correspond to one compartment of the internal volume, while a region at a relatively lower pressure may correspond to a second compartment in the internal volume of the housing.

The housing may be cylindrical, or generally cylindrical. The housing comprising an internal volume may be a single component. Alternatively, the housing comprising an internal volume may be comprised of multiple components. The multiple components may be coupled or otherwise fitted together. For example, at least two of the multiple components may be threaded together, connected via an interference press fit, a linkage or the like.

The housing may comprise a coupling arrangement by which at least a part of the seal integrity test system is fitted thereto. The coupling arrangement may be located on an external surface of the housing. The coupling arrangement may be or comprise a coupling area. The coupling area be or comprise a profile against or in which to fit the seal integrity test system. Such a profile may comprise a groove, rib, dimple or the like. The profile may extend circumferentially around the housing, for example where the housing is cylindrical. The profile may comprise a roughened area, and/or a smooth area. The profile may be and area defined simply by its location, i.e. an area that is proximate the sealing arrangement, a seal in the sealing arrangement, a preferred volume (e.g. compartment) of the internal volume.

The coupling arrangement (e.g. the profile of the coupling arrangement) may assist the seal integrity test system to provide a measurement of a parameter. For example having a coupling arrangement or area that extends (e.g. extends circumferentially) around the housing may increase the contact area between the seal integrity test system, thereby increasing its sensitivity to a changing parameter in the housing, for example.

The coupling area may be located adjacent (e.g. radially adjacent) the sealing arrangement, or a part of the sealing arrangement such as a seal in the sealing arrangement. The coupling area may be located adjacent (e.g. radially adjacent) a compartment in the housing, for example so as to enable effective measurement of a parameter associated with said compartment in the housing. The coupling area may be axially aligned with sealing arrangement, or a part of the sealing arrangement. Alternatively or additionally, the coupling area may be axially aligned with a compartment in the housing.

The coupling arrangement may comprise a plurality of coupling areas, for example a first and a second coupling area. The first coupling area may be axially adjacent to the second coupling area. The first coupling area may be axially aligned (e.g. axially in-line) with the second coupling area. The first coupling area may be axially spaced from the second coupling area. The first coupling area may be circumferentially aligned with the second coupling area. The first coupling area may be circumferentially opposite the second coupling area. The first coupling area may be radially adjacent the sealing arrangement, a seal in the sealing arrangement, or a compartment in the housing, for example. The second coupling area may be radially adjacent the sealed internal volume (e.g. axially displaced from the sealing arrangement). The first coupling area may be axially aligned with a first compartment of the internal volume, and the second coupling area may be axially aligned with a second compartment of the internal volume. In use, the first coupling area may permit coupling of the seal integrity test system proximate a region of expected higher pressure during a seal integrity test, while the second coupling area may permit coupling of the seal integrity system proximate a region of expected lower pressure during a seal integrity test.

The internal volume may be generally cylindrical in shape. The internal volume may comprise a section of relatively smaller diameter and a second of relatively larger diameter. The section of relatively smaller diameter may be located proximate the port in the housing, while the region of relatively larger diameter may be located distal to the port in the housing. The section of relatively smaller diameter may be axially spaced from the second of relatively larger diameter. The section of relatively smaller diameter may be directly connected to the section of relatively larger diameter. The section of relatively smaller diameter may comprise or define one compartment in the housing, while the section of relatively larger diameter may comprise or define a separate compartment. The port in the housing and the section of relatively smaller diameter may be sized based on the diameter of a conduit to be received by the port. The section of relatively larger diameter may house a component, e.g. an electrical component, and may be sized as such.

The internal volume of the housing may comprise a groove or indent for location of a seal, for example a seal of the sealing arrangement. A groove or indent may be located at an interface between the section of relatively smaller diameter and relatively larger diameter, so as to locate a seal at the interface. Sealing at the interface may facilitate compartmentalization of the inner housing, by forming a first compartment in the section of the housing of relatively smaller diameter, and a second compartment in the section of the housing of relatively larger diameter.

The conduit to be received by the port in the housing may be, for example, an electrical cable, or a conduit carrying hydraulic fluid. The conduit may be, for example, a TEC (Tubing Encapsulated Cable). Where the conduit is an electrical cable, the conduit may terminate in an electrical connection, for example a stab-in electrical connection.

The seal integrity test system may comprise at least one sensor. The seal integrity test system may comprise a plurality of sensors. For example, the seal integrity test system may comprise a strain gauge, for example a wire or semiconductor strain gauge, or a piezoelectric strain sensing chip, a temperature sensor, an acoustic transmitter and receiver, electrical contact pins, or the like.

The at least one sensor of the seal integrity test system may be located on a coupling area of the coupling arrangement.

Where the seal integrity system comprises a strain gauge, the coupling area may be or comprise an indent, notch or groove in an external surface of the housing. The strain gauge may extend circumferentially around the housing. In such a configuration, the strain gauge may function to sense an increase in the level of radial strain in the material of the housing, which may manifest itself in an increase in the diameter of the housing, for example caused by a local increase in the pressure in the internal volume of the housing. Alternatively, the strain gauge may be configured to measure axial strain in the housing. Such a local increase in the pressure in the internal volume of the housing may indicate the presence of a pressurized fluid inside the internal volume of the housing, for example inside a compartment of the internal volume of the housing. The pressurized fluid then indicates a leak of a high pressure fluid in an external environment.

Where the seal integrity system comprises a temperature sensor, the coupling area may be or comprise an aperture, or blind hole, located in an external surface of the housing in which the temperature sensor is located. The temperature sensor may function to sense a local change in temperature of the housing. Such a local change in temperature in the housing may indicate the presence of a heated/cooled fluid (e.g. a fluid that is relatively hotter or cooler than the housing) inside the internal volume of the housing, for example, inside a compartment in the internal volume of the housing.

Where the seal integrity system comprises an acoustic transmitter and receiver, the coupling area may be or comprise an external area of the housing which, for example, may have a smooth surface. A grease or lubricant may be positioned between the acoustic transmitter and/or receiver to assist in the transmission and/or reception of acoustic signals through the housing. In this case, the seal integrity system may be coupled to the housing via the grease/lubricant. The acoustic transmitter and receiver may be used to provide a local measurement of the acoustic transmission properties of the housing and the internal volume therein (e.g. a compartment of the internal volume therein). A change in the acoustic properties of the housing and the internal volume therein may indicate, for example, the presence of a fluid in the internal volume of the housing, for example a compartment in the internal volume of the housing.

Where the seal integrity system comprises electrical contact pins, the coupling area may be or comprise an aperture located in an external surface of the housing in which the electrical contact pins are located. At least a part of the electrical contact pins may extend through the housing and into the internal volume of the housing. The electrical contact pins may measure electrical resistance, and a change in electrical resistance at the electrical contact pin may indicate the presence of fluid (e.g. an electrically conductive fluid) in the internal volume of the housing, for example in a compartment in the internal volume of the housing.

The seal integrity test system may comprise a configurable test component. The configurable test component may be configurable and reconfigurable so as to enable testing of the sealing arrangement. For example, where the sealing arrangement comprises multiple individual seals, the configurable test component may be configured and reconfigured to selectively enable testing of individual seals of the sealing arrangement. Configuration and reconfiguration of the configurable test component may alter the definition of the compartments in the housing, for example by energizing or de-energizing the sealing arrangement, or a seal in the sealing arrangement.

The configurable test component may be located in or on the housing. The housing may comprise a profile in which to receive the configurable test component. The configurable test component may be coupled to the housing, for example by a threaded connection, in which case the profile of the housing may be in the form of a threaded coupling. The configurable test component may be located proximate the port in the housing. The configurable test component may be aligned with the port in the housing. The configurable test component may comprise an aperture which is aligned with the port in the housing. The aperture may be located in the center of the configurable test component. The aperture may extend axially of the configurable test component. In use, the aperture in the configurable test component may permit a conduit to enter the housing through the aperture in the configurable test component. As such, in use the configurable test component may circumscribe a conduit entering the housing. The aperture may comprise a seal—for example a rubber o-ring type seal—for sealing between the conduit and the configurable test component. The housing may comprise a seal located at an interface between the configurable test component and the housing.

The configurable test component may be generally cylindrical in shape. For example, the configurable test component may have a conventionally cylindrical shape, or the side of the cylinder may be or comprise an angular surface which may assist with gripping the configurable test component (e.g. as a nut comprises angular sides for the purposes of enabling gripping by a spanner).

Configuration and reconfiguration of the configurable test component may be effected by movement of the configurable test component relative to the housing. For example, axial movement of the configurable test component relative to the housing may move the configurable test component between a first configuration and a second configuration. Additionally or alternatively, rotational movement of the configurable test component may configure the test component between a first and a second configuration. Where the configurable test component is coupled to the housing via a threaded arrangement or coupling, rotational movement of the configurable test component by a user may further effect an axial movement of the configurable test component relative to the housing.

In a first configuration, the configurable test component may be arranged relative to the housing to enable pressure integrity testing of a first seal of the sealing arrangement. In said first configuration, the configurable test component may be arranged such that a first seal of the sealing arrangement is energized. With the first seal energized, a pressure test may be applied to the first seal of the sealing arrangement, so as to test the integrity of the first seal.

In a second configuration, the configurable test component may be arranged relative to the housing to enable pressure integrity testing of a second seal of the sealing arrangement. In said second configuration, the configurable test component may be arranged such that a second seal of the sealing arrangement is energized. With the second seal energized, a pressure test may be applied to the second seal of the sealing arrangement, so as to test the integrity of the second seal.

In some examples, the configurable test component may have more than two configurations—for example three or four configurations. In such examples, the configurable test component may be configurable to test the pressure integrity of more than two seals (e.g. a third and a fourth seal).

The configurable test component may have an operational configuration, in which all the seals in the sealing arrangement are energized, and in which configuration the configurable test component is placed upon use of the connector, for example use downhole. The operational configuration may be the same as either the first or the second configuration.

The first seal may be located within the internal volume of the housing, for example in a compartment, or between compartments, of the internal volume in the housing. Once installed into the internal volume of the housing, the first seal may be permanently energized, regardless of the configuration of the configurable test component. The first seal may be located at an interface between the section of relatively smaller diameter and the section of relatively larger diameter in the housing.

The second seal may be located proximate the port in the housing. Alternatively, the second seal may be located or mounted on the configurable test component. The second seal may be located on a surface of the configurable test component facing the housing. In the second configuration, axial movement of the configurable test component relative to the housing may compress the second seal between the configurable test component and the housing, thereby energizing the second seal. When the second seal is energized, this may reduce or prohibit fluid communication between an external environment and the first seal. With the configurable test component in the first configuration, the axial positioning thereof may be such that there is no, or reduced, compression of the second seal between the configurable test component and the housing. While the second seal is not energized, fluid communication between the environment external to the connector and the first seal may be possible, thus enabling pressure integrity testing of the first seal. While the second seal is energized, only fluid communication between the environment external to the connector and the second seal may be possible, thus enabling pressure integrity testing of the second seal. With this configuration, the user may be able to independent verify the integrity of both the first and the second seals in the connector.

The configurable test component may comprise or define a test port or ports. When coupled to the housing, a test port may be located on an external surface of the configurable test component. The pressure test port may be configurable to couple to a pressure source, for example a source of high pressure fluid. Being provided on an outer surface of the test component, a user may have easy access to the test port, which may assist in testing the integrity of the sealing arrangement.

The configurable test component may comprise or define a test conduit. The test conduit may permit fluid communication between the test port and the sealing arrangement, for example the first and/or second seal in the sealing arrangement. With the configurable test component in the first configuration, the test conduit may permit fluid communication between the test port and a first seal in the sealing arrangement, and with the configurable test component in the second configuration, the test conduit may permit fluid communication between the test port and a second seal in the sealing arrangement, for example, due to energization of different seals in the sealing arrangement as previously described.

The seals in the seal arrangement may be o-ring type seals e.g. metal or rubber o-ring seals. The seal or seals in the sealing arrangement may comprise metal seals. The seal or seals in the sealing arrangement may comprise rubber seals.

The configurable test component may comprise a test component seal, for sealing between the housing and the configurable test component.

One described example may relate to a method for testing the integrity of a sealing arrangement in a connector comprising a housing defining an internal volume, a sealing arrangement for sealing the internal volume in the housing and a seal integrity test system comprising a sensor, the method comprising: coupling the seal integrity test system to the housing; pressure testing the sealing arrangement by providing a source of pressurized fluid external to the housing; measuring a parameter using the sensor of the seal integrity test system to determine the integrity of the sealing arrangement.

The method may comprise coupling an integrity test component of the integrity test system to the housing.

The method may comprise pressure testing the sealing arrangement with the configurable test component in a first configuration, and subsequently performing a pressure integrity test on the sealing arrangement with the configurable test component in a second configuration.

The method may comprise providing an integrity test system having a first sensor and a second sensor. The method may comprise mounting the first sensor and the second sensor on an exterior of the housing. The method may comprise measuring a first parameter using the first sensor, and simultaneously measuring a second parameter using the second sensor. The method may comprise comparing the first and second parameters to determine the integrity of the sealing arrangement. Such a method may permit the integrity of the sealing assembly to be measured without requiring intrusive testing.

The method may comprise configuring a configurable test component between a first configuration and a second configuration. Such configuration may enable testing of individual seals of the sealing arrangement. The method may comprise pressure testing a first seal by configuring the configurable test component in a first configuration, and a second seal by configuring the configurable test component in a second configuration.

The method may comprise pressure testing a first seal in the sealing arrangement by exposing the first seal to a pressurized fluid, and measuring a parameter using a first sensor of the seal integrity test system to determine the integrity of the first seal. Further testing the first seal, the method may comprise removing (e.g. bleeding off) the pressurized fluid to which the first seal was previously exposed, reconfiguring the configurable test component, and exposing the second seal to a pressurized fluid, and measuring a parameter using a second sensor of the seal integrity test system to determine the integrity of the second seal.

The method may comprise providing the seal integrity test system with a first sensor and a second sensor, and positioning the first and second sensors relative to the housing such that, upon pressure testing the sealing arrangement, one of the first and second sensors is expected to measure a change in the properties of the housing and/or the internal volume therein (e.g. a change in the strain in the material of the housing, a change in temperature, electrical conductivity, acoustic properties or the like). If the first and second sensors provide measurements as expected, then the integrity of the sealing arrangement is confirmed. However, if the first and second sensors do not provide measurements as expected (e.g. if the both the first and second sensors measure a change in the properties of the housing and/or the internal volume) then the sealing arrangement is deemed to lack integrity.

A further described example may relate to a pressure sealing device, comprising: a housing defining an internal volume; a sensor arrangement located on the exterior of the housing; a test component positionable to seal the internal volume, and configurable between a first position and a second position; wherein upon pressure testing the internal volume, the test component is configurable to the first position to test a first seal and a second position to test a second seal.

DETAILED DESCRIPTION OF THE INVENTION

Figure 1:
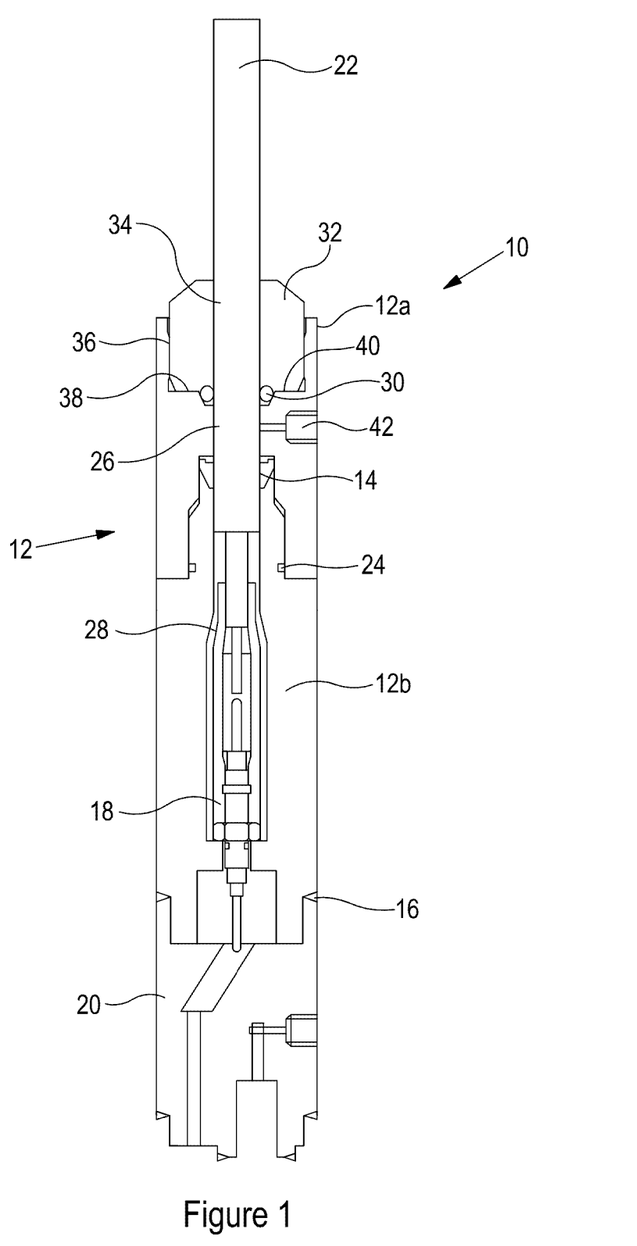
FIG. 1 is a cross sectional view of a connector according to the prior art.

FIG. 1 illustrates an example of a known connector 10. The connector 10 comprises a housing 12 made up of upper and lower parts 12a, 12b and having a generally cylindrical shape. In this example, the upper and lower parts of the housing 12a, 12b (each also having a generally cylindrical shape) are fitted together, and a primary seal 14 is positioned at the interface of housing upper and lower parts 12a, 12b. A secondary seal 24 is also positioned at the interface between the upper and lower parts of the housing 12a, 12b.

The lower part of the housing 12b is connected to a device 20 via a weld 16. The lower part of the housing 12b comprises an internal volume 28 which, in this example, houses an electrical connector 18, which enters the housing 12 via a cable 22 through a port 26.

The port 26 is defined by the upper part of the housing 12a, and can be considered to have an external side, which faces the external environment in which the connector 10 is located, and an internal side, which abuts the lower part of the housing 12b. The primary seal 14 is located adjacent the internal side of the port 26, and assists to provide a seal between the external environment and the internal volume 28. In this case, the primary seal is shown 14 is shown as being a metal seal.

An external seal 30 is located on the external side of the port 26, and is held in place by an end cap 32. The end cap 32 is generally cylindrical in shape, and comprises an aperture 34 through which cable 22 extends towards the port 26. The end cap is engaged with a profile 36, which is defined by the upper part of the housing 12a, such that a base 38 of the end cap 32 abuts an external surface 40 of the upper part of the housing 12a. The engagement between the end cap 32 and the upper part of the housing 12a holds the external seal 30 in place. The external seal 30 assists to provide a seal between the internal volume 28 of the housing 12 and the external environment.

The upper part of the housing 12a additionally comprises a pressure test port 42. The pressure test port 42 is located in a side wall of the upper part of the housing 12a, and provides a passage which connects the external environment to the port 26, axially between the external seal 30 and the primary seal 14. In practice, the pressure test port 42 enables the integrity of the primary seal 14 and the external seal 30 to be tested by applying a pressure source (e.g. a pressurized fluid) to the test port 42 prior to installation of the connector 10. If the pressure at the pressure source does not reduce over time, then it is concluded that the primary seal 14 and the external seal 30 are effective, and the connector 10 can be used, for example, downhole.

Once the pressure test has been performed, the pressure test port is closed with a plug (not shown). However, this method of pressure testing a connector has drawbacks as, for example, a further pressure test port 42 is required to be provided in the housing 12, which creates the potential for a further leak path through the housing 12. Further, test port 42 is located so as to test both the external seal 30 and the primary seal 14. Should a leak path occur through the test port 42 to the internal volume 38 of the housing, this would effectively bypass the external seal 30, meaning that the sealing integrity of the entire connector would rely solely on the primary seal 14.

Figure 2:
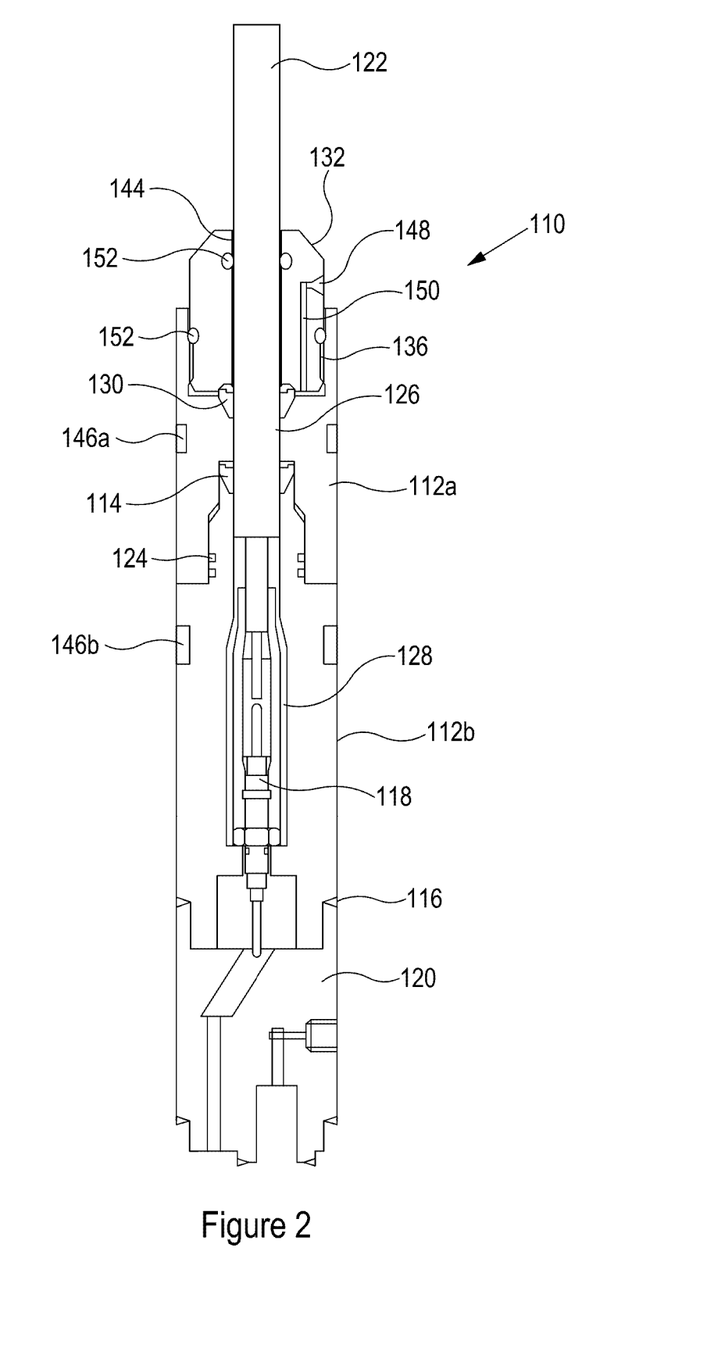
FIG. 2 is a cross sectional view of a connector having an electrical line connection.

FIG. 2 shows an example of a connector 110, having a different configuration to the known connector of FIG. 1. Where components of the connector of FIG. 1 and FIG. 2 are the same or similar, alike reference numerals have been used, incremented in number by 100.

As with the connector shown in FIG. 1, the connector 110 comprises a housing 112 comprising upper and lower parts 112a, 112b, each having a generally cylindrical shape. The upper and lower parts 112a, 112b are fitted together, and a primary seal 114 is positioned at the interface of the upper and lower parts of the housing 112a, 112b. A secondary seal arrangement 124 is positioned is also positioned at the interface between the upper and lower parts of the housing 112a, 112b. As previous, the lower part of the housing 112b is connected to a device 120 via a weld 116. In this example, the lower part of the housing 112b comprises an internal volume 128 that houses an electrical connector 118, entering the housing 112 via a cable 122 through a port 126.

The port 126 is defined by the upper part of the housing 112a and, as in FIG. 1, has an external side and an internal side, the internal side abutting the lower part of the housing 112b, and the primary seal 114 being located adjacent the internal side of the port 126, and assists to provide sealing between the external environment in which the connector 110 is located, and the internal volume 128 of the housing 112. As before, the primary seal is shown as being a metal seal, although the skilled person will understand that any other appropriate type of sealing component may be used. In being positioned at the interface between the upper and the lower parts of the housing 112a, 112b, the primary seal 114 is compressed within the housing 112, such that it provides an effective fluid seal.

An external seal 130 is located on the external side of the port 126. In this example, the external seal 130 is shown as being of the same type as the primary seal 114. The external seal 130 is held in place by an end cap 132. The end cap 132 is generally cylindrical in shape, and comprises an aperture 144 through which the cable 122 extends towards the port 126. The end cap 132 is engaged with a profile 136, defined by the upper part of the housing 112a. In this case, the profile 136 comprises a threaded arrangement, and the end cap 132 has a corresponding threaded profile on an external surface thereof, such that the end cap 132 and the upper part of the housing 112a are in threaded engagement. As shown in FIG. 2, the engagement between the end cap 132 and the upper part of the housing 112a holds the external seal in place 130, and effectively energizes the external seal 130, thus assisting to provide a fluid seal between the external environment and the internal volume 128 of the housing 112. In addition, the end cap comprises a sealing arrangement 152 which, in this example, comprises two o-ring type seals situated adjacent the threaded profile 136, and also in the aperture 144, between the cable 122 and the end cap 132. The sealing arrangement 152 assists to prevent fluid leakage from an external environment to the external seal 130 via the end cap.

The end cap 132 of FIG. 2 comprises a test port 148 which leads to a test conduit 150. The test port 148 and test conduit 150 effectively provide a bypass to the sealing arrangement 152, allowing fluid communication between the external environment and the external seal 130. During a test of the integrity of the seals, a pressure source (e.g. a pressurized fluid) may be provided at the test port 148, thereby exposing the energized external seal 130 to the pressure source (in the configuration shown in FIG. 2). In doing so, it is possible to test the integrity of the external seal 130.

Figure 3A:
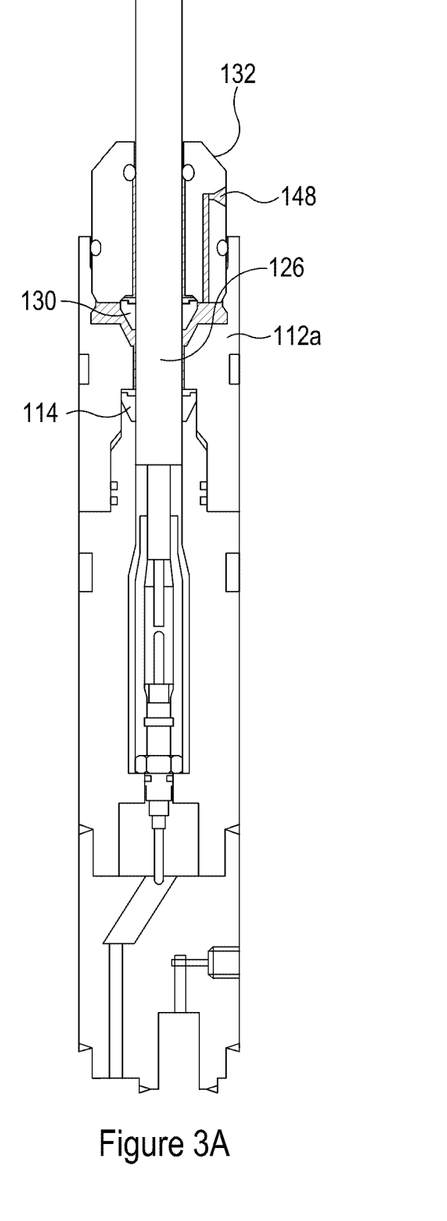
FIGS. 3A and 3B show further configurations of the connector of FIG. 2.
Figure 3B:
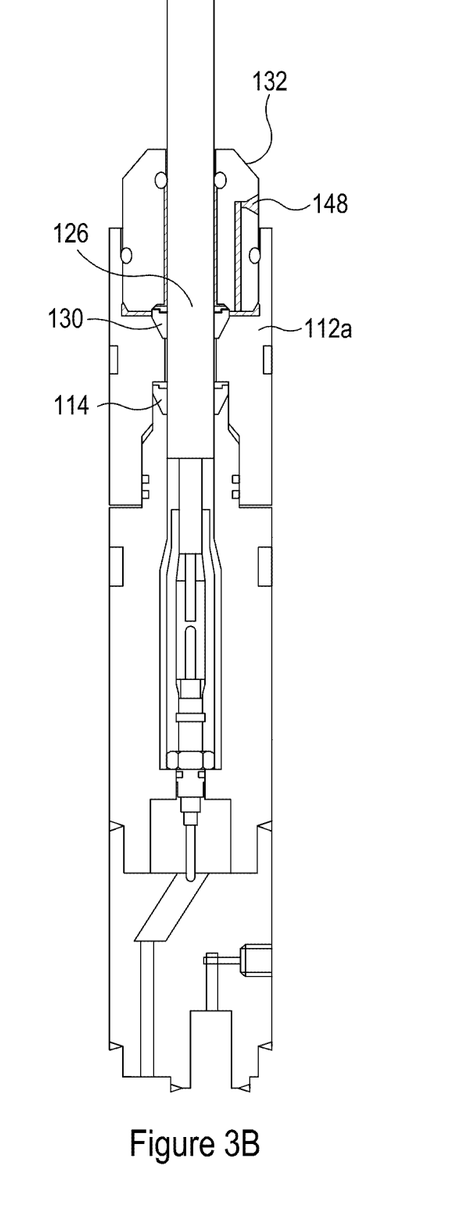

As best seen in FIGS. 3A and 3B, the end cap 132 is in threaded engagement with the upper part of the housing 112a, and it is possible to reconfigure the end cap 132, by moving it axially relative to the housing 112 for the purpose of testing the integrity of the seals of the connector 110—as such the end cap 132 may be considered to be an example of a configurable test component. In moving the end cap 132 axially, it is possible to remove the compression of the external seal 130 between the end cap 132 and the housing 112, such that the external seal is de-energized, and no longer provides an effective fluid seal. In this configuration, providing a source of pressure at the test port 148 will enable the integrity of the primary seal 114 to be tested, as the pressure source will bypass the external seal 130, thus exposing the primary seal 114, located on the internal side of port 126, to an increase in pressure.

In this example, the upper and lower parts of the housing 112a, 112b each comprise an upper and lower sensor 146a, 146b, located in a circumferential notch. In this case, the sensors are in the form of force sensors which could be, for example, strain gauges wrapped around the upper and lower parts of the housing 112a, 112b in the respective notches. The strain gauge may be a wire or semiconductor strain gauge, which may be used to measure radial strain in the material of the housing 112. Alternatively, the strain gauge may be a piezoelectric strain sensing chip. In such an example, the strain gauge may be located in a small recess in the housing 112, rather than being wrapped around the housing 112. The skilled person will also appreciate that such a strain gauge may also be configurable to measure axial strain in the housing 112. The skilled person will understand that it is possible to use other types of sensor, configured to be coupled (e.g. mounted on or in) to the housing 112 as appropriate. The upper and lower sensors 146a, 146b are sensitive enough that they are able to measure an increase in pressure inside the housing, as a result of the changing level of strain in the material of the housing.

The sensor 146a is positioned in the upper part of the housing 112a axially adjacent the port in the housing, such that its axial location is between the external seal 130 and the primary seal 114. The lower notch is positioned axially adjacent the internal volume in the housing containing, in this case, the electrical connector 118.

Upon pressure testing the external seal 130 and the primary seal 114, by the method described previously, a user is able to identify whether either seal is effective as a result of the output of the sensors, 146a, 146b which in this example are contained in notches, but in other examples may be coupled to the housing 112 by different means. As the sensors are used to test the integrity of the primary seal 114 and external seal 130 (i.e. the sealing arrangement), the sensors can be considered to form at least part of a seal integrity test system.

During testing of the external seal 130, as described above, it is expected that the external seal 130 would form a barrier to the pressure to which it is exposed via the test port 148. As such, neither the region of the housing axially adjacent the port 126, nor the region of the housing axially adjacent the internal volume 128 be exposed to the pressure source, and as such neither of the upper or lower strain gauges 146a, 146b would register any significant change in the strain of the material of the housing 112 at these regions. Given this output from the strain gauges 146a, 146b, a user would be able to determine that external seal 130 was effective. If, however, the upper strain gauge 146a and/or lower strain gauge 146b were to register a change in the strain of the material of the housing, then a user would be able to conclude that the external seal was not effective as this indicates a leakage of pressurized past external seal 130, causing an increase in the strain of the material of the housing 112.

During testing of the primary seal 114, as described above, the external seal 130 will be de-energized, such that the port 126 will be exposed to the high pressure fluid. In this instance, a user would expect the upper strain gauge 146a to register a change in the strain of the material of the housing, as the adjacent port 126 is exposed to the high pressure source. If the primary seal 114 is effective, then the internal volume 128 of the housing 112 would not be exposed to the pressure source, as it would be contained behind the primary seal 114. As such, a user would not expect the lower strain gauge 146b to register a change in strain. However, should the primary seal 114 be ineffective, then the internal volume 128 would be exposed to the pressure source, and thus the lower strain gauge 146b would register a change in strain, thus allowing a user to conclude that the primary seal 114 was ineffective.

Such a configuration of connector therefore allows a user to determine the efficacy of each individual seal in the connector without having to have any additional ports in the housing, and does not require sensors or other measurement equipment to be placed internally of the connector 110.

As the sensors are required only to measure a degree of change in the level of a parameter, a precise reading may not be required, and a simply binary output may suffice. One particular example of a sensor which may provide such an output is a thin solid state capacitor made with a flexible substrate (e.g. Kapton), which may be wrapped around the device. Such a sensor would allow the measurement of a capacitance change when the material of the housing 112 is under strain. Such a device may have good long term stability, and relatively few calibration issues.

FIGS. 4 to 7 show a connector 210 similar to that shown in FIGS. 2, 3A and 3B, although rather than an electrical connection, these figures show a simple hydraulic connection 260, and therefore no electrical connection is included.

Figure 4:
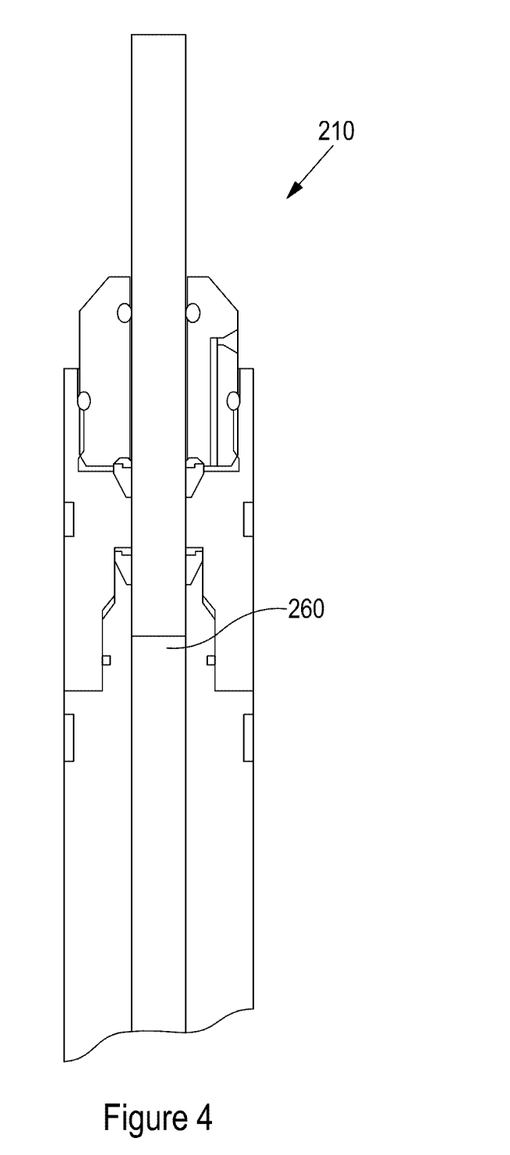
FIG. 4 is a cross sectional view of a connector having a hydraulic line connection.
Figure 5A:
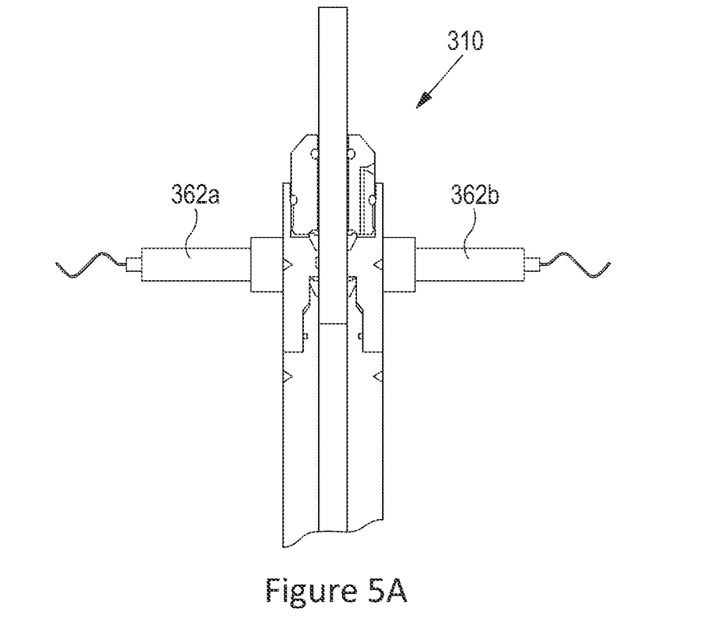
FIGS. 5A and 5B show another example of a connector coupled to an acoustic transmitter/receiver.
Figure 5B:
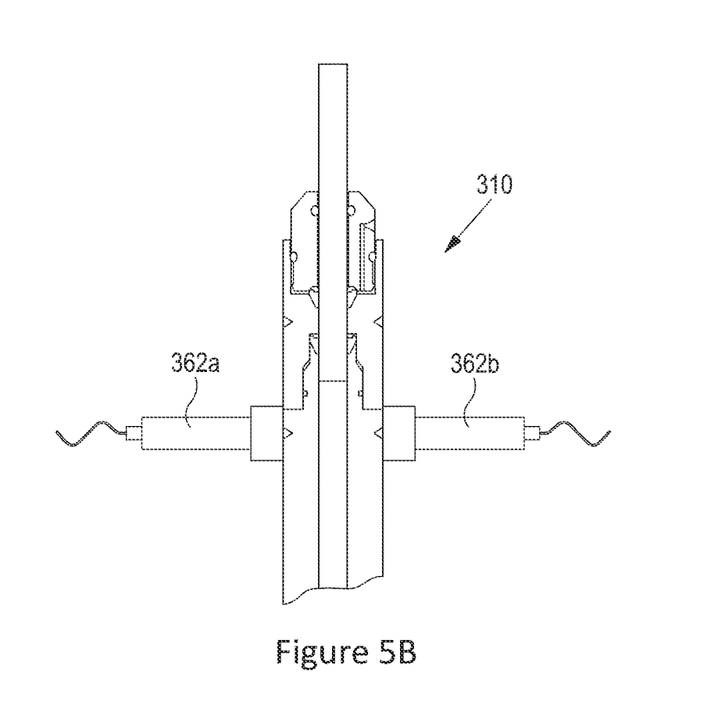

In FIGS. 5A and 5B, a connector 310 is shown which is similar to that of FIG. 4, but rather than comprising notches into which a force sensor (e.g. a strain gauge) is placed, this connector 310 is provided with upper and lower coupling areas 346a, 346b to which an acoustic receiver 362a, and transmitter 362b may be coupled. Testing of the sealing arrangement of the connector 310 can be performed as described above, moving the acoustic receiver and transmitter 362a, 362b between the positions shown in FIGS. 5A and 5B. The presence of fluid between the acoustic receiver and transmitter would result in a change in the acoustic transfer function, thus indicating a leak in the connector 310.

Figure 6:
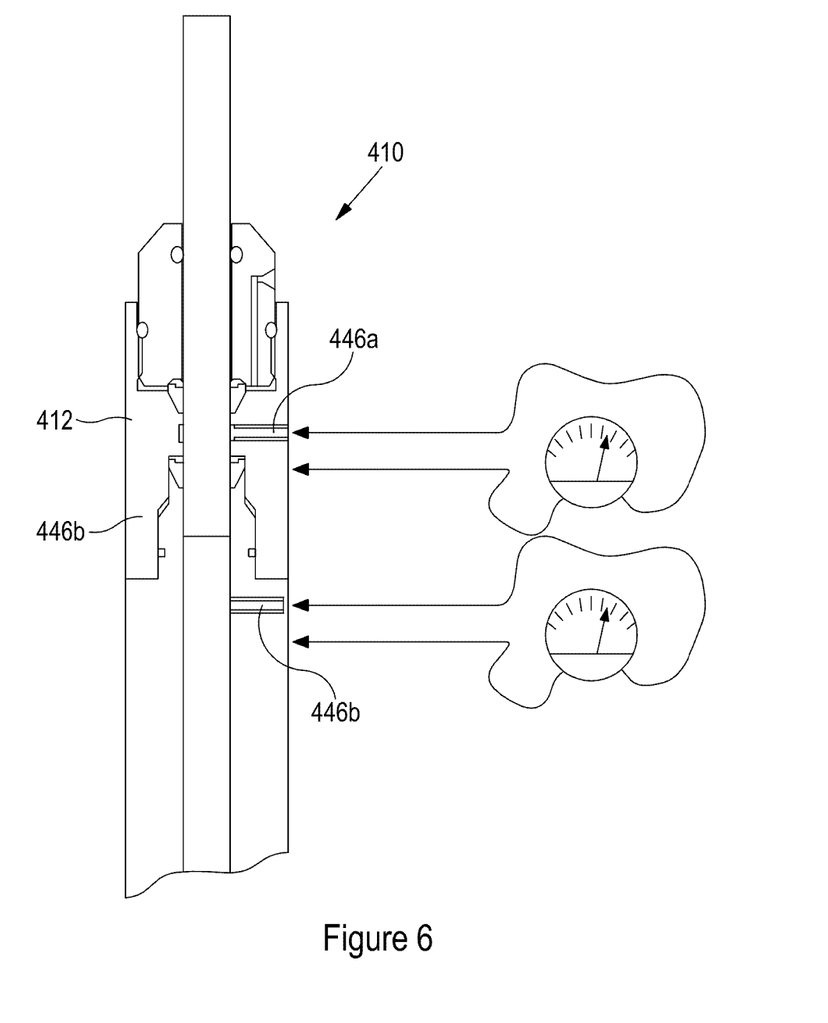
FIG. 6 shows a further example of a connector, shown coupled an electrical resistivity sensor.

FIG. 6 illustrates a further example of a connector 410, which is similar to that shown in FIG. 4, but where the integrity test system comprises upper and lower contact pins 446a, 446b that are built into the housing 412. In this example integrity testing is as previously described, and the integrity or failure of the seals is measured by a change in impedance measured at the upper and/or lower contact pins 446a, 446b. As such, the pressure source should be an electrically conductive fluid, such as salt water. Such an example may also be achieved through use of factor tested glass to metal electrical pin contacts.

Figure 7:
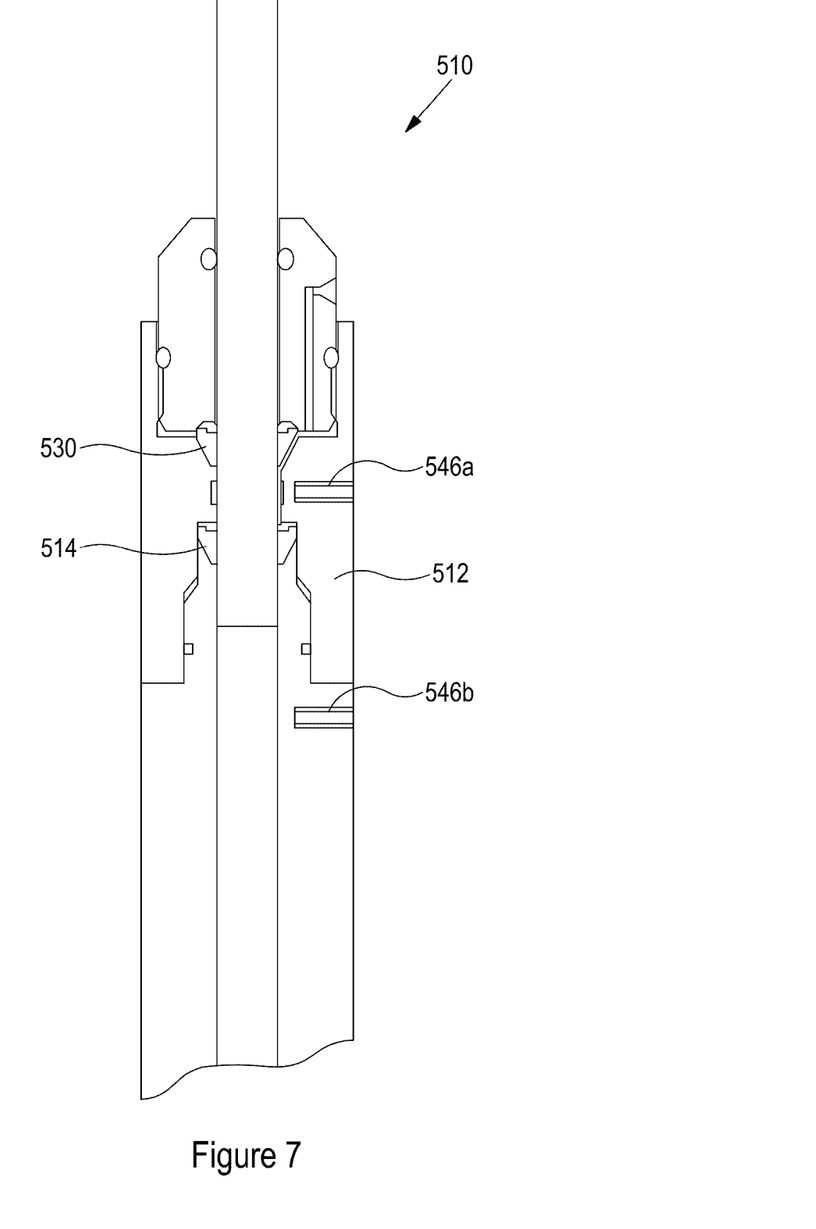
FIG. 7 is yet another example of a connector, shown coupled to a temperature sensing arrangement.

FIG. 7 shows an example of a connector 510 similar to that shown in FIG. 4, but where the integrity test system comprises an upper and a lower temperature sensor 546a, 546b which are each located in a blind aperture in the housing 512. Integrity testing of the external seal 530 and the primary seal 514 is as previously described, only in this example the pressure source should be a heated fluid, for example, a heated oil. A user is then able to determine the integrity or failure of the seals depending on the measurements provided by the temperature sensors.

Figure 8:
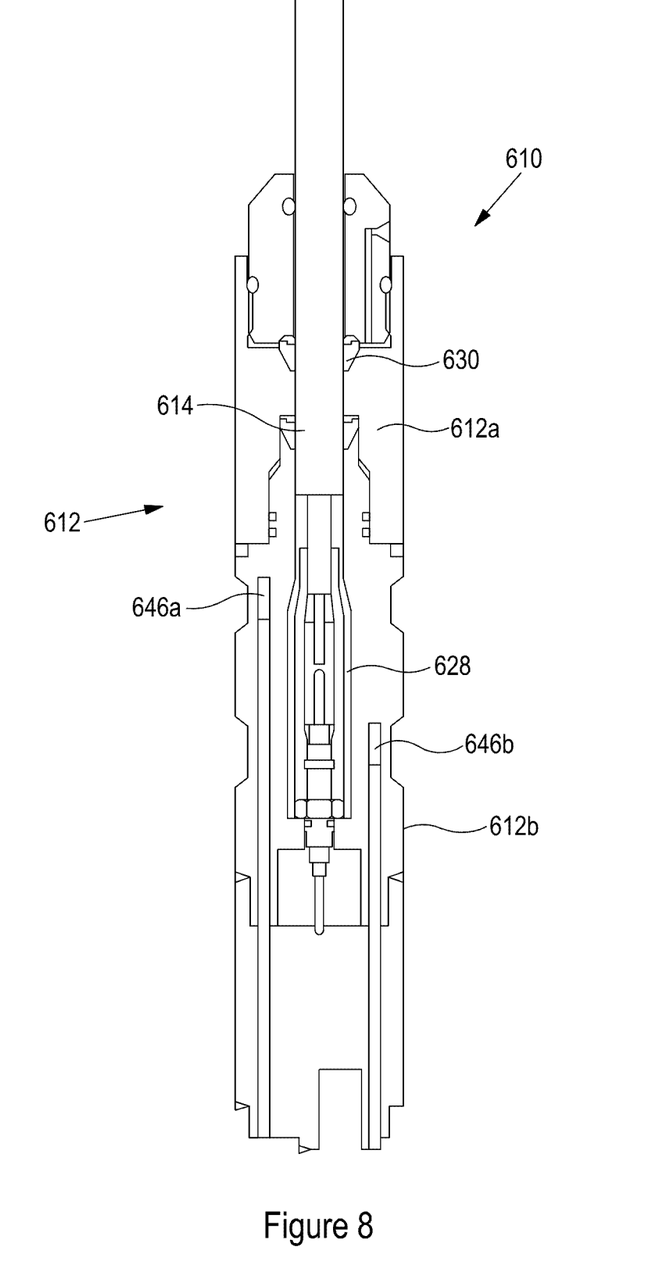
FIG. 8 shows an example connector having a sensor arrangement integrated into the housing wall.

FIG. 8 shows a further example of a connector 610, which is substantially similar to the connector 110 shown in FIG. 2. This example shows a connector having a housing 612 with an upper and a lower part 612a, 612b. The connector 610 comprises an upper and a lower sensor 646a, 646b, which in this example are strain gauges, and both of which are located in the wall of the lower part of the housing 612b. A pressure integrity test may be performed in the same way as previously described. In this example, when the integrity of the external seal 630 is being tested, the pressure source will create an axial force on the upper part of the housing 612a, which will in turn create an axial force on the lower part of the housing 612b, thereby causing strain in the lower part of the housing 612b. Should the external seal 630 leak, the primary seal 614 will be exposed to the pressure source, which will change the axial force exerted on the lower part of the housing 612b by the upper part of the housing 612a, thus creating a change in the strain in the lower part of the housing 612b, which will be measured by the upper sensor 646a, and alert a user to the fact that the external seal 630 has failed.

During testing of the primary seal 614 in the method described above, a failure in the primary seal 614 would cause the internal volume 628 to be exposed to the pressure source, thus changing the level of strain in the lower part of the housing 612b. The change in strain of this part of the housing 612b would be measured by the lower sensor 646b, and alert a user to the failure of the primary seal 614.

Figure 9:
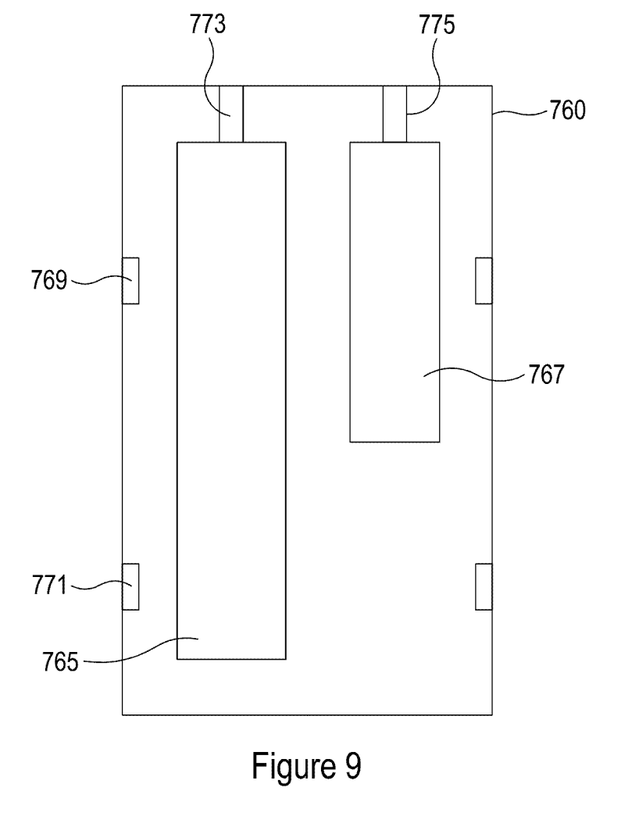
FIG. 9 shows a general example of a device which could be used to test seal integrity.

FIG. 9 illustrates a general example of a device 760 shown for the purposes of clarifying the measurement system of the aforedescribed examples. The device 760 comprises a larger internal chamber 765 and a smaller internal chamber 767, the larger internal chamber 765 having a port 773, while the smaller internal chamber 767 has a port 775. In this example, the larger internal chamber 765 contains a fluid of a lower pressure, while smaller internal chamber 767 contains a fluid having a higher pressure. The device 760 comprises an upper sensor 769 and a lower sensor 771 (in this example, the sensors shown are strain gauges), which are wrapped around circumferential notches in the wall of the device 760. While the system maintains a "normal" state, the upper sensor 769 will measure a high level of strain due to its proximity to the high pressure smaller chamber 767, and the lower sensor 771 will measure a low level of strain.

Should a high pressure fluid leak into the larger chamber, a user would be alerted as the lower sensor 771 would measure a high level of strain due to its proximity to the larger chamber 765 which is now at a high pressure. Should the high pressure fluid leak from the smaller chamber 767, a user would be alerted as the upper sensor 769 will now measure a lower level of strain in the device, due to the reduction in pressure of the smaller chamber 767.

Figure 10:
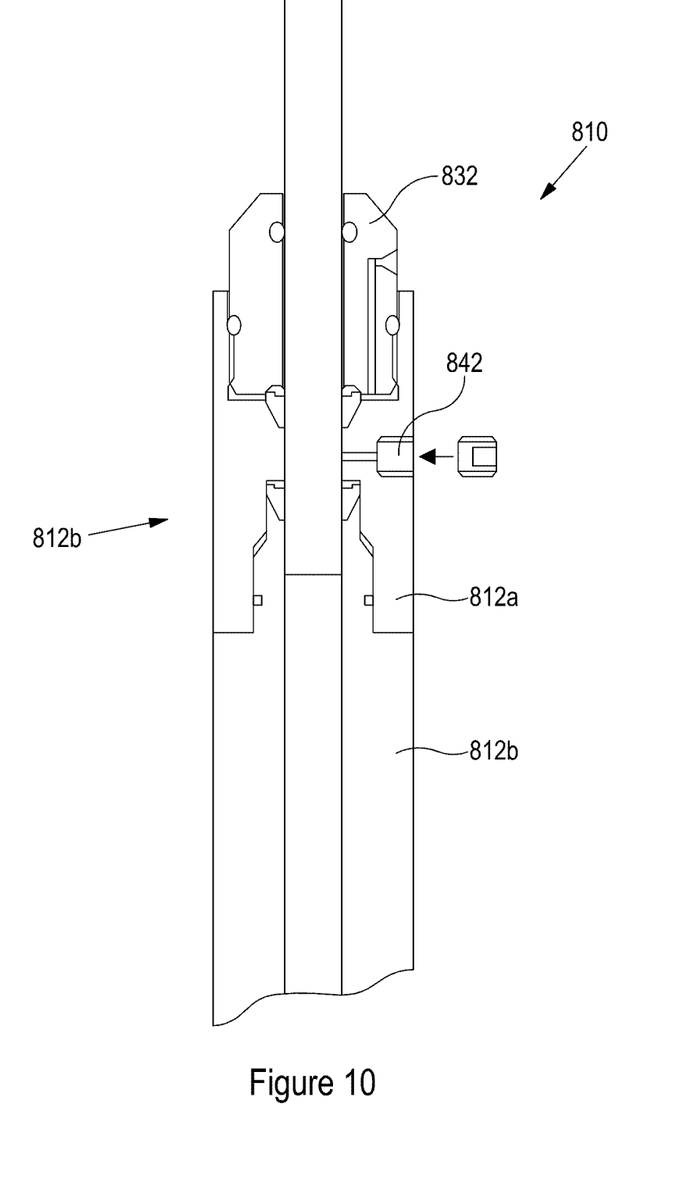
FIG. 10 is a further cross sectional view of a connector according to the prior art.

FIG. 10 shows an example of a connector 810 having a housing 812 comprising an upper part 812a and a lower part 812b. An end cap 832, as described in previous examples (e.g. as described in FIG. 2), is coupled with a thread (e.g. threadedly coupled) to the upper part of the housing 812a. The upper part of the housing 812a comprises a test port 842, similar to that previously described in FIG. 1. This example shows an end cap 832 shown in previous examples coupled to a known housing 812 as is shown in FIG. 1.

Figure 11:
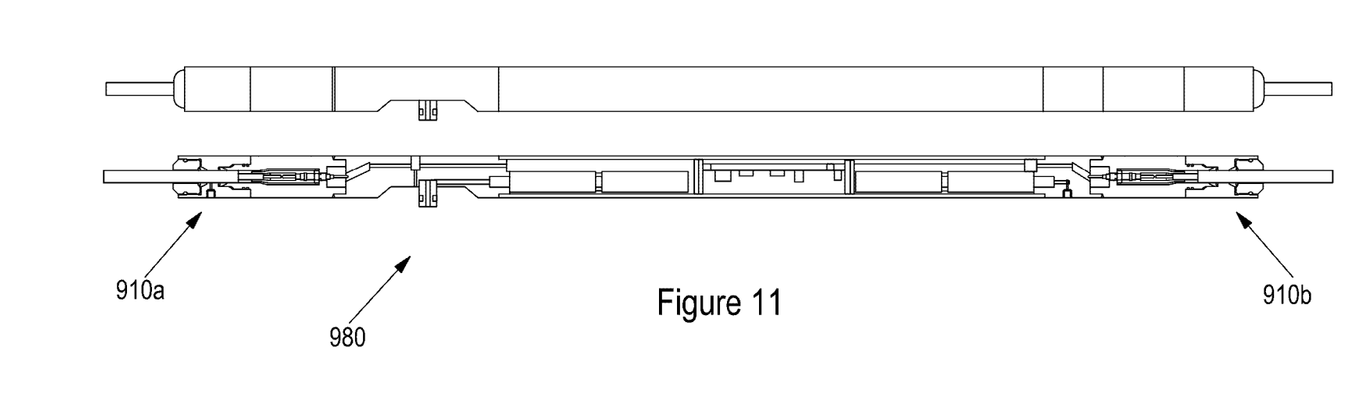
FIG. 11 shows an example of a connector connected to a device, in use.

FIG. 11 illustrates connectors 910a, 910b as used in a downhole device 980. As can be seen, the connectors 910a, 910b are located at either axial end of the device. Such connectors 910a, 910b may permit continuous monitoring of the pressure integrity of the connections of the downhole device 980, for example, where the integrity test systems are coupled with a real time telemetry system, allowing the downhole device 980 to report the integrity of the connections to a surface location.

The skilled person will understand that various modifications may be made to the above without departing from the scope of the invention, and various features from one example as described above may be able to be used in another described example, without their specific recitation above.

Although the sealing arrangement and seal integrity test system has been illustrated as used with a connector, the skilled person will appreciate that such a sealing arrangement and integrity test system may have a broader range of uses. For example, the sealing arrangement and integrity test system may be applied to any piece of equipment where it is critical to know if there has been a pressure or fluid leak, without the requirement of boring test ports into the piece of equipment.

The invention claimed is:

1. A connector, comprising:
    a housing comprising an internal volume;
    a port in the housing for receiving a conduit and providing access to the internal volume;
    a sealing arrangement for sealing the internal volume in the housing, the sealing arrangement having a first seal and a second seal;
    a seal integrity test system comprising a sensor coupled to the housing;
    a configurable test component being disposable in a first configuration to enable testing of the first seal of the sealing arrangement, and disposable in a second configuration to enable testing of the second seal of the sealing arrangement; and
    the seal integrity test system being configured to provide a measurement based on the pressure inside the internal volume of the housing to establish the integrity of the sealing arrangement.

2. The connector according to claim 1, wherein the seal integrity test system is configured to detect the level of pressure in the internal volume of the housing.

3. The connector according to claim 2, wherein the seal integrity test system comprises a plurality of sensors, the plurality of sensors is configured to detect the level of pressure at multiple locations in the internal volume of the housing.

4. The connector according to claim 1, wherein the housing comprises a coupling arrangement by which at least a part of the seal integrity test system is fitted thereto.

5. The connector according to claim 4, wherein the coupling arrangement is located on an external surface of the housing.

6. The connector according to claim 5, wherein the coupling arrangement comprises a coupling area extending circumferentially around the housing.

7. The connector according to claim 5, wherein the sealing arrangement compartmentalizes the internal volume into a plurality of compartments, and the coupling arrangement is axially aligned with at least one of the plurality of compartments.

8. The connector according to claim 5, wherein the coupling arrangement comprises a first and a second coupling area, and wherein the internal volume comprises a first compartment and a second compartment, and the first coupling area is located axially aligned with the first compartment, and the second coupling area is located axially aligned with the second compartment.

9. The connector according to claim 1, wherein the sealing arrangement compartmentalizes the internal volume into a plurality of compartments.

10. The connector according to claim 1, wherein the configurable test component is disposable in the first configuration and in the second configuration by axial movement of the configurable test component relative to the housing.

11. The connector according to claim 1, wherein the first seal is located within the internal volume of the housing, and the second seal is located proximate the port in the housing.

12. The connector according to claim 1, wherein the configurable test component comprises a test port and defines a test conduit.

13. A method for testing the integrity of a sealing arrangement in a connector, the connector comprising a housing that defines an internal volume, a sealing arrangement configured to seal the internal volume in the housing, and a seal integrity test system comprising a sensor and a configurable test component, wherein the sealing arrangement includes a first seal and a second seal, the method comprising:
   coupling the seal integrity test system to the housing;
   configuring the configurable test component to energize or de-energize the sealing arrangement or the seal in the sealing arrangement to enable testing of the sealing arrangement;
   disposing the configurable test component in a first configuration to test the first seal, and pressure testing the first seal using a source of pressurized fluid, and measuring a first parameter using the sensor of the seal integrity test system to determine an integrity of the first seal; and
   disposing the configurable test component in a second configuration to test the second seal, and pressure testing the second seal using the source of pressurized fluid, and measuring a second parameter using the sensor of the seal integrity test system to determine an integrity of the second seal.

14. The method according to claim 13, wherein the sensor includes a first sensor and a second sensor, and the method includes comprising mounting the first sensor and the second sensor on an exterior of the housing, measuring the first parameter using the first sensor, and simultaneously measuring the second parameter using the second sensor, and comparing the first and second parameters to determine the integrity of the sealing arrangement.

\* \* \* \* \*